June 11, 1946.   W. H. SIEBELS   2,401,974
PIPE
Filed March 20, 1944
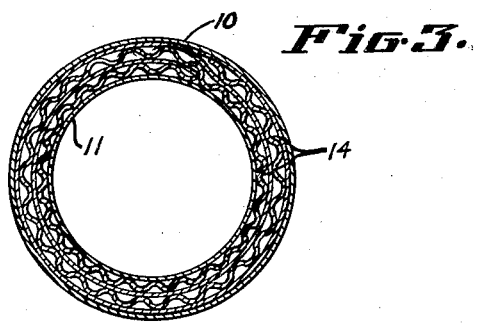
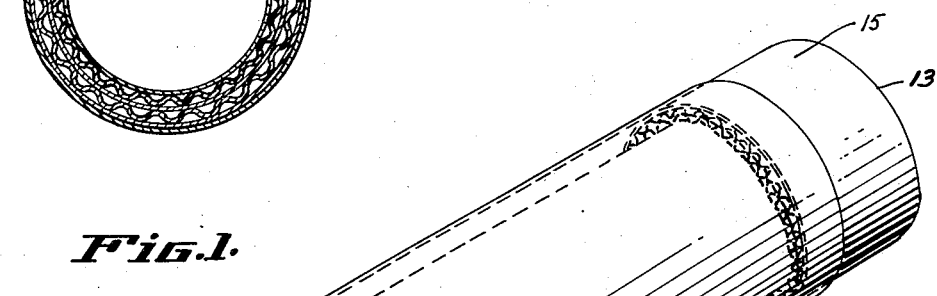
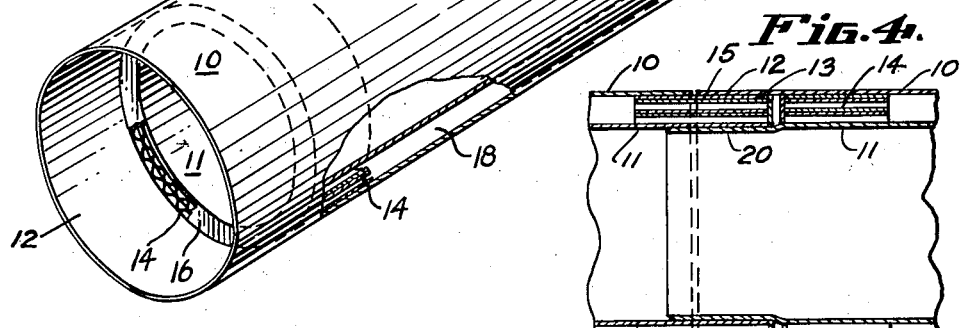
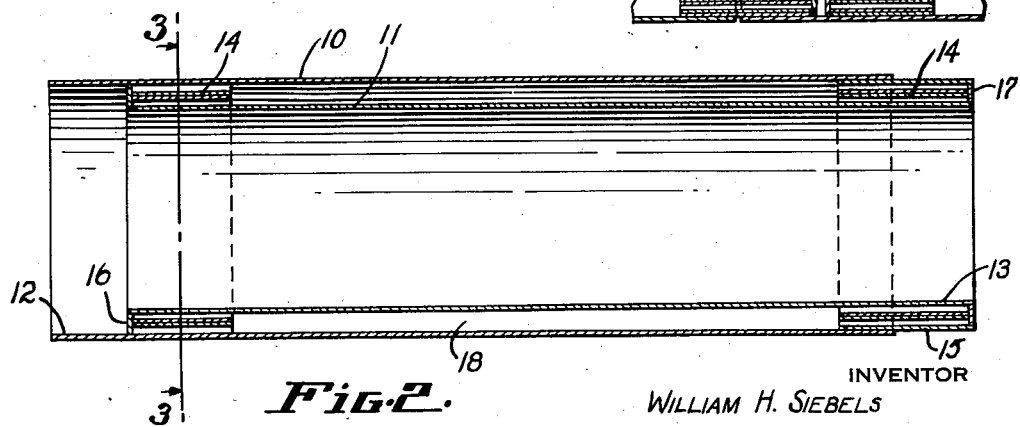
INVENTOR
WILLIAM H. SIEBELS
BY
ATTORNEY Patented June 11, 1946

2,401,974

UNITED STATES PATENT OFFICE 2,401,974

PIPE

William H. Siebels, San Francisco, Calif., assignor to Harry C. Dutton, Jr., Millbrae, Calif.

Application March 20, 1944, Serial No. 527,275

3 Claims. (Cl. 138—76)

My invention relates to prefabricated air conditioning duct, and particularly to improvements therein.

The object of my invention is to provide a sturdy, long-lasting, efficient insulated duct made from non-critical material and to provide a duct which is easily erected and is particularly useful in the air conditioning and the building industry.

Pursuant to Rev. St. Sec. 4888 I shall describe a preferred form of my invention and by so doing I do not intend to limit my patent except as required by the scope of the attached claims.

In the drawing,

Fig. 1 is a view in perspective of a section of pipe with portions broken away to show the interior construction;

Fig. 2 is a view in cross-section taken along the axis of the pipe of Fig. 1;

Fig. 3 is a cross-sectional end view taken on the line 3—3 of Fig. 2; and

Fig. 4 shows an assembled joint, with a slight modification on the female end.

While I have shown and will describe the duct as made in circular form, it is understood that it is equally adaptable to the purposes of my invention when made in an oval, square, rectangular, or oblong form in cross-section.

In the drawing, the outer shell 10 is preferably made of a hard impregnated asbestos fabric, although other asbestos-like materials or hard paper substances are satisfactory as ducts are usually shielded from the elements. The inner shell 11 can be made of like material and is of substantially the same length as the outer shell. When assembled, the two shells of each section of duct are displaced axially to provide a female end 12 and projecting male end 13.

The inner shell 11 is made of a sufficiently smaller size than the outer shell 10 so that a band of spacing material 14 may be inserted between the two shells 10 and 11. These spacing bands 14 preferably are made of corrugated asbestos air-cell paper, although they made be made of other material, metallic or non-metallic, and preferably are short sections placed around the inner shell 11 near each of its ends. The band 14 located near the male end 13 may have a collar 15 fitted around it so as to complete the male end of the duct. This collar is usually made of the same material as the shells 10 and 11 and is of a size to provide a sliding friction fit with the female end 12 of the next adjacent section of duct to which it is connected. In the event this collar 15 is omitted then the band of corrugated material located adjacent the end 13 will serve the same purpose so far as providing a snug sliding fit with the female end of the next adjacent section of duct.

To seal off the dead air space between the spaced shells 10 and 11, I provide the rings 16 and 17 which may be of the same material as the shells or the ends of the air-cell rings may be filled with an adhesive or cement.

All of the parts are cemented together so that each section of duct comprises an integral unit having the dead air space 18 and the male and female ends 12 and 15, or 12 and 14, adapting it to ready assembly with other sections of similarly made duct.

In Fig. 4 I show the joint formed when two sections of the duct are put together. Here the female end 12 is modified slightly over the form shown in Figs. 1 and 2, in that the inner shell 11 has a contracted lip extension 20 to engage the inner surface of the adjacent inner shell 11 with a sliding fit, while the outer lip 12 engages the outer surface of the adjacent collar 15. This joint assures a minimum of leakage.

What I claim is:

1. Air conditioning duct comprising inner and outer pipes axially offset to provide male and female ends, a collar of air-cell asbestos paper secured around the inner pipe adjacent each of its ends and having the cells sealed off at their outward ends and a collar of paper fitted around the air cell collar at the male end and secured to the inside of the outer pipe.

2. In air conditioning duct the combination of an inner shell, a band of spacing air-cell material around each end, a short outer shell surrounding one of said bands, and an outer shell embracing the other of said bands and a portion of said short outer shell, whereby said short outer shell becomes a male joint member and the other end of the outer shell becomes a female joint member.

3. An air conditioning duct section adapted for erection with other like sections to form a duct of any desired length, each section comprising inner and outer pipes of asbestos-like material, the outer pipe being shorter than the inner pipe, the inner pipe having a contracted portion extending axially inward from one end, a collar of air-cell material secured around the inner pipe near its end opposite to said contracted portion and projecting beyond the end of said outer pipe, and another collar of like material secured between the outer and inner pipes adjacent the region where the latter is contracted and inwardly spaced from the end of the outer pipe by about the distance the other collar projects beyond the end of the outer pipe, whereby when two or more of said sections are connected together said projecting collar on one section will fit between the outer pipe and the contracted portion of the inner pipe.

WILLIAM H. SIEBELS.